March 13, 1928.
W. H. McKISSICK
1,662,320
SAFETY SHEAVE BLOCK
Filed May 16, 1927
2 Sheets-Sheet 2
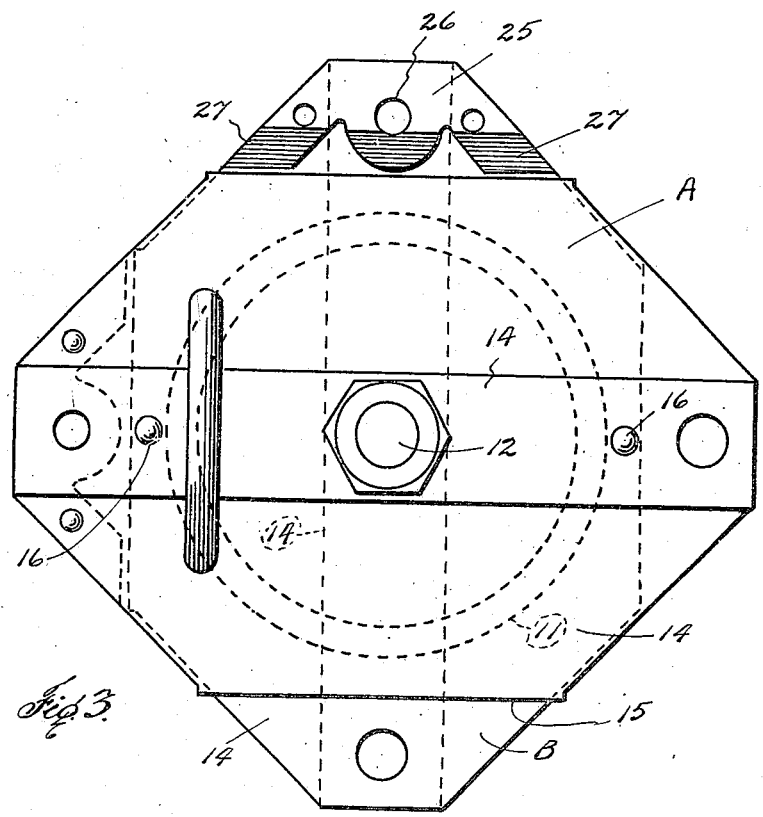
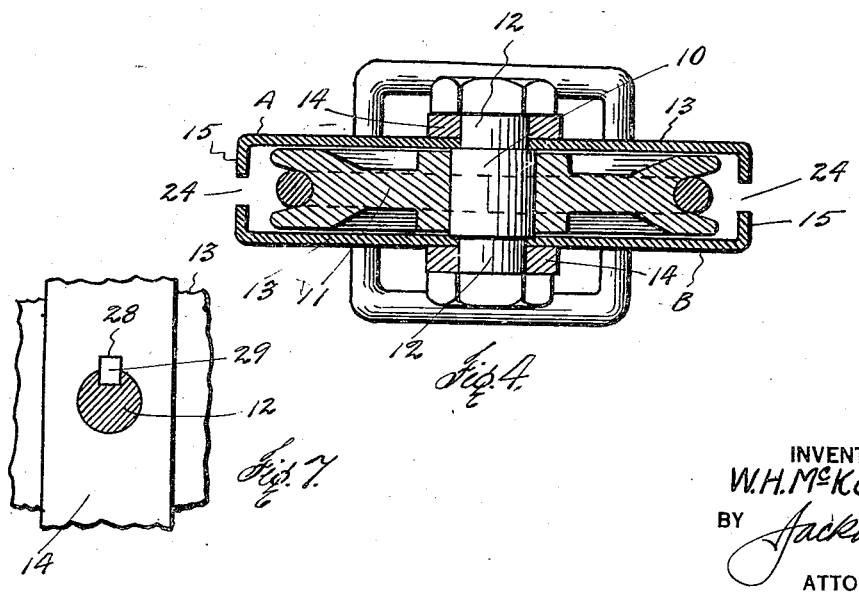
INVENTOR
W. H. McKissick
BY Jack A. Ashley
ATTORNEY Patented Mar. 13, 1928.

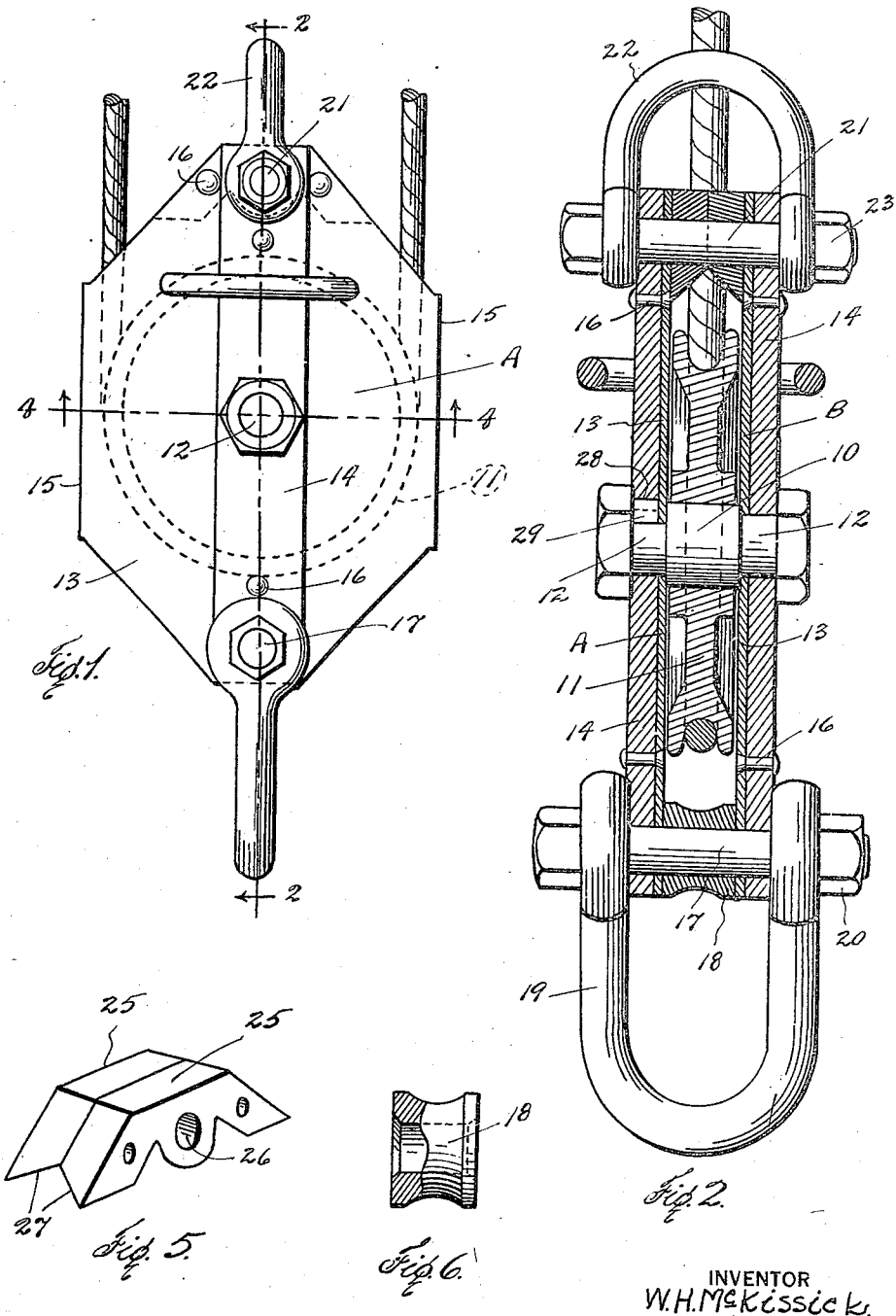

1,662,320

UNITED STATES PATENT OFFICE.

WILLIAM H. McKISSICK, OF TULSA, OKLAHOMA.

SAFETY SHEAVE BLOCK.

Application filed May 16, 1927. Serial No. 191,636.

This invention relates to new and useful improvements in safety sheave blocks.

The object of the invention is to provide a sheave block comprising housing members having line guards and arranged so that by partially rotating one member, the guards are separated and the housing is opened for the removal or insertion of the cable lines.

A further object of the invention is to provide a safety sheave block comprising a pair of housing members centrally pivoted on the sheave bolt or axle and each carrying guards, substantially enclosing the cable lines, whereby upon a partial rotation of one of the housing members, its guards are displaced from those of the other member and the block opened.

Another object of the invention is to provide means for fastening one of the housing members and the axle against relative rotation, while the other housing member is mounted to rotate.

A construction designed to carry out the invention will be hereinafter described, together with other features of the invention.

The invention will be more readily understood from a reading of the following specification and by reference to the accompanying drawings, in which is shown an example of the invention, and wherein:

Fig. 1 is a side elevation of a sheave block constructed in accordance with my invention, Fig. 2 is an enlarged longituidnal sectional view taken on the line 2—2 of Fig. 1, Fig. 3 is an enlarged side elevation showing the block in its open position, Fig. 4 is a cross-sectional view taken on the line 4—4 of Fig. 1, Fig. 5 is a perspective view of the top guards, Fig. 6 is a view of the spacer spool partly in elevation and partly in section, and Fig. 7 is a detail showing the axle and housing member locking connection.

In the drawings the numeral 10 designates an axle having an enlarged central bearing portion on which a sheave 11 is journaled and provided with reduced trunnions 12 having their outer ends screw-threaded. A housing comprising side plates 13 and side bars 14, together with guard flanges 15 at the ends of the side plates, is mounted on the axle 10.

In describing the block, it will be assumed that it occupies a vertical position and it will, therefore, be referred to as having top, bottom, side and end portions, but such terms are used merely as descriptive designations and do not limit the block to use in a vertical position as it may be used in a horizontal or any other desirable position.

The side bars 14 are suitably fastened to the outer faces of the plates 13, centrally thereof, as by rivets 16. The bars extend from the top to the bottom of the housing and the side plates are preferably cut off at an angle of about 45° on lines extending from the ends of the bars to the guard flanges 15 at the top and bottom of the housing. This gives the block a symmetrical shape and eliminates surplus material, however, the shape of the block is immaterial and the plates may be formed as is found most desirable. The plates and flanges being riveted together constitute two housing members which I have designated as A and B. These members are mounted on the trunnions 12 of the axle with the plates bearing against the enlarged central portion of said axle on each side of the sheave.

At the lower end of the block a bottom becket bolt 17 passes through the members A and B and a spool 18 mounted on the bolt between the plates 13 serves as a spacer for the bottom of the block. A U-shaped bottom becket 19 straddles the housing and is mounted on said bolt, which is held in place by a nut 20. An upper becket bolt 21 passes through the top portions of the housing members A and B and is suspended in an upper becket 22 straddling the housing and retained by a nut 23 on the bolt. It will be seen that by removing the nuts 20 and 23 the bolts 17 and 21 may be pulled out and the beckets removed.

A very important element of the block is its safety features. The guard flanges 15, which are directed inwardly from the plates 13 and preferably at right-angles thereto, are one of the safety features. These flanges being directed toward each other and extending transversely of the sheave and longitudinally on each side of the longitudinal axis of the block, cover the cable line which passes through the block and prevent the workman catching his fingers therein. The flanges may be spaced apart to form gaps 24, as is best shown in Fig. 4, or they may come closer together.

Another safety measure is carried out by providing guard blocks 25 at the top of the housing. Two of these blocks are provided, each being riveted to the inner side of one of the plates 13 and having a central aperture 26 for receiving the upper becket bolt 21. The blocks are shaped to fit the contour of the upper ends of the side plates and each block is beveled at 27 as is shown in Figs. 3 and 5, at their lower ends so as to provide notches for the cable lines and also to obviate abrupt corners at these points. The guards overhang the sheave 11 and close the top of the housing, only sufficient openings being left between the guards and the flanges 15 for the passage of the cable lines. The workman's fingers are thus protected.

In order to open the block so that the cable line may be removed or inserted, the becket bolts 17 and 21 and the beckets 19 and 22 are removed. This leaves the housing members A and B free to rotate. However it is necessary to turn the member A at right angles to the member B to mismatch the flanges 15 and the blocks 25. To do this the member 13 has a key slot 28 receiving a key 29 seated in one of the trunnions 12 of the axle 10, to keep the axle and the other member B from rotating. By this arrangement the member A may be readily swung to the position shown in Fig. 3.

When the housing member A is rotated to open the housing, one of the blocks 25 is carried away from the other and the guard flanges 15 of the member A are displaced from the flanges 15 of the member B. The bevels 27 are necessary in the form illustrated to provide openings for the passage of the cable lines under the guard flanges when the block is opened as is shown in Fig. 3. The cable line may be freely applied to or removed from the open sheave block as ample clearance will be provided. The sheave block is easy to close and fasten. The guard blocks 25 overhanging the sheave 11 and co-acting with the guard flanges is a very important feature of the device and when combined with the rotation of the housing member upon a central pivot, constitutes an advance in the art.

In my Letters Patent No. 1,633,489, issued June 21, 1927, I have shown a housing comprising two members mounted so that the housing is opened upon the rotation of one of said members, but the rotatable member is eccentrically pivoted with relation to the guard flanges and it is illustrated as requiring a half rotation to open, whereas the present block may be opened with a quarter rotation and is more compact in structure than the eccentric block.

Various changes in the size and shape of the different parts, as well as modifications and alterations, may be made within the scope of the appended claims.

What I claim, is:

1. In a safety sheave block, a housing comprising two members each having inturned guard flanges on opposite sides of its longitudinal axis, the guard flanges of one member being normally alined and registered with the guard flanges of the other member, one of said members being centrally pivoted and rotatable with relation to the other member to move the flanges out of registration and open the housing, a sheave journaled in the housing, and means for fastening the housing members in their closed position.

2. In a safety sheave block, a housing comprising two members each having inturned guard flanges on opposite sides of its longitudinal axis, the guard flanges of one member being normally alined and registered with the guard flanges of the other member, an axle mounted in said members centrally between the flanges of each, one of said members being rotatable with relation to the other member and having said axle as its pivot, whereby the flanges are moved out of registration and the housing is opened, a sheave journaled on the axle, and means for fastening the housing members in their closed position.

3. In a safety sheave block, a housing comprising two members each having inturned guard flanges on opposite sides of its longitudinal axis, the guard flanges of one member being normally alined and registered with the guard flanges of the other member, an axle mounted in said members centrally between the flanges of each, one of said members being rotatable with relation to the other member and having said axle as its pivot, whereby the flanges are moved out of registration and the housing is opened, a sheave journaled on the axle, guard blocks secured to the upper ends of the housing members and bridging the space above the sheave, and means for fastening the housing members in their closed position.

4. In a safety sheave block, a pair of side plates having longitudinal inturned flanges, side bars secured longitudinally to the side plates between their flanges, the plates being fastened to the bars and constituting therewith housing members, an axle extending through the housing members centrally between their flanges, a sheave journaled on the axle, guard blocks overhanging the sheave and one secured to each housing member, and means for suspending the housing.

5. In a safety sheave block, a pair of side plates having longitudinal inturned flanges, side bars secured longitudinally to the side plates between their flanges, the plates being fastened to the bars and constituting therewith housing members, an axle extending through the housing members centrally between their flanges, trunnions of the axle penetrating the housing members, one of the housing members being fastened on its trunnion and the other housing member being rotatable upon its trunnion, a sheave mounted on the axle between side plates, guard blocks overhanging the sheave between housing members, and beckets secured to opposite ends of the housing.

In testimony whereof I affix my signature.

WILLIAM H. McKISSICK.